United States Patent
Bautz

[15] 3,700,250
[45] Oct. 24, 1972

[54] GRIPPING TYPE COMPOUND APPLYING CHUCK ASSEMBLY

[72] Inventor: Fred H. Bautz, Hazel Crest, Ill.

[73] Assignee: Continental Can Company, Inc., New York, N.Y.

[22] Filed: Dec. 1, 1970

[21] Appl. No.: 94,048

[52] U.S. Cl. ............... 279/35, 279/1 C, 279/1 M, 279/106, 269/8, 269/238
[51] Int. Cl. .................... B23b 31/18, B25b 1/04
[58] Field of Search ........ 279/35, 106, 1 R, 1 M, 1 C, 279/1 E, 1 SG, 2; 269/8, 58, 237, 238, 287

[56] References Cited

UNITED STATES PATENTS

| 1,846,898 | 2/1932 | Packer | 279/106 X |
| 1,022,761 | 4/1912 | Stvanek | 279/35 X |

Primary Examiner—Gil Weidenfeld
Attorney—Americus Mitchell, Joseph E. Kerwin and William A. Dittman

[57] ABSTRACT

A chuck assembly for positively gripping a cap, a bottle top or a can end. This chuck assembly is used on a compound applying machine to lift the rotating cap up to the compound applying nozzle and hold the cap by positive mechanical pressure while compound is applied from the nozzle to the inside of the rotating cap.

12 Claims, 7 Drawing Figures

PATENTED OCT 24 1972 3,700,250
SHEET 1 OF 2
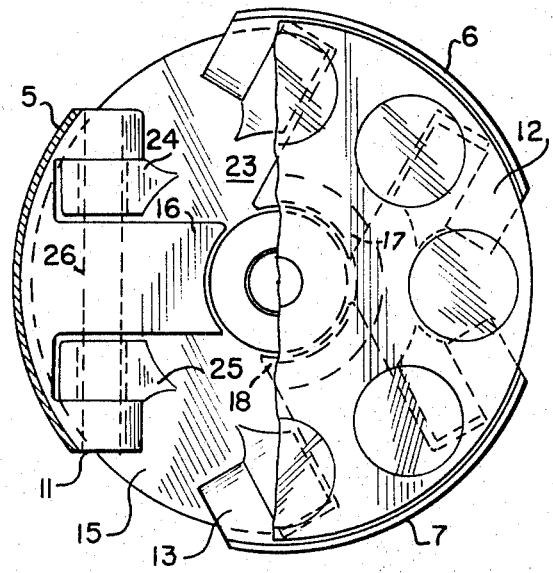
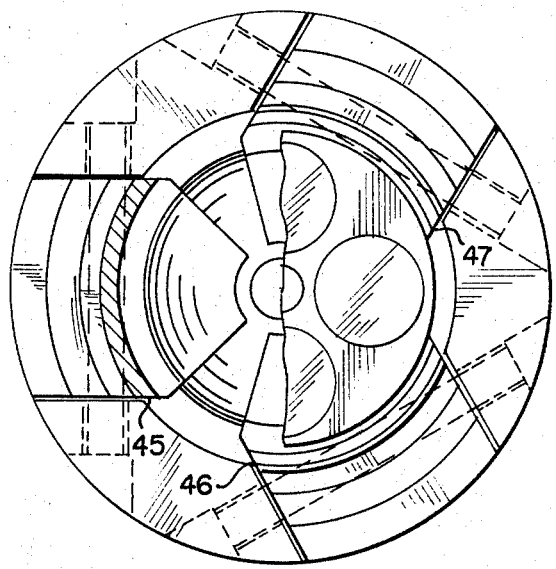
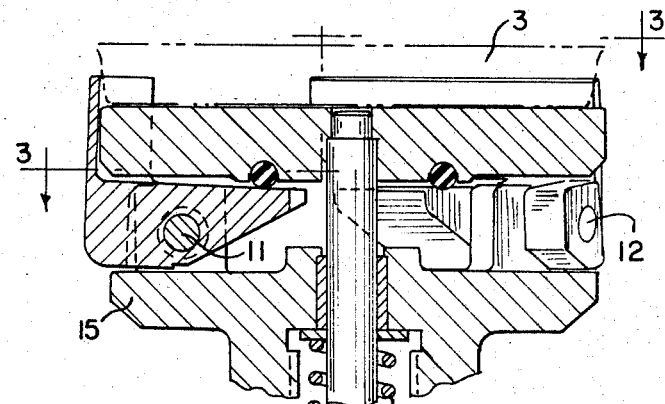
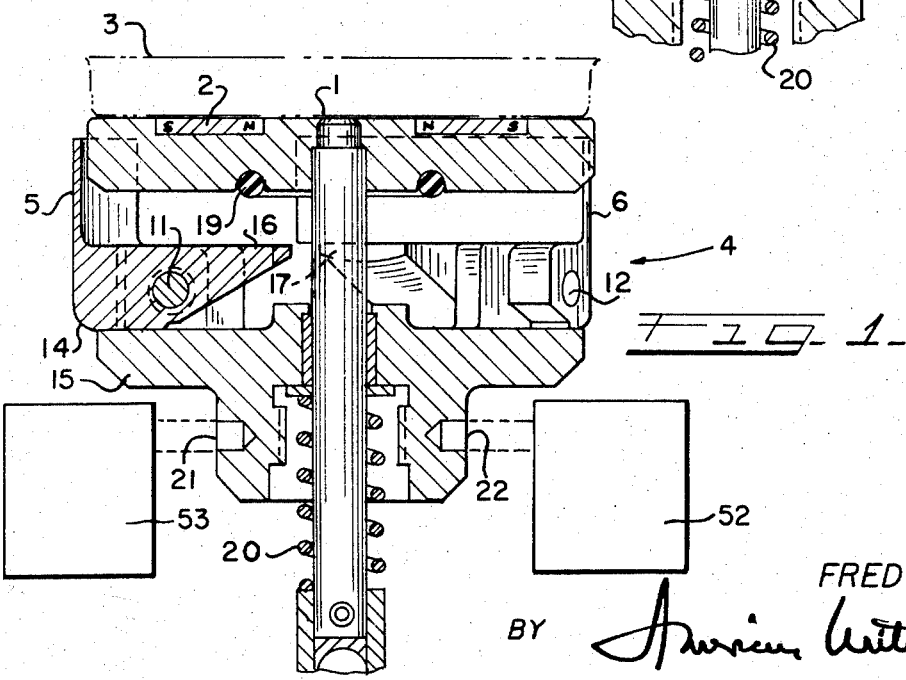
INVENTOR
FRED H. BAUTZ
BY [signature]
ATTY.

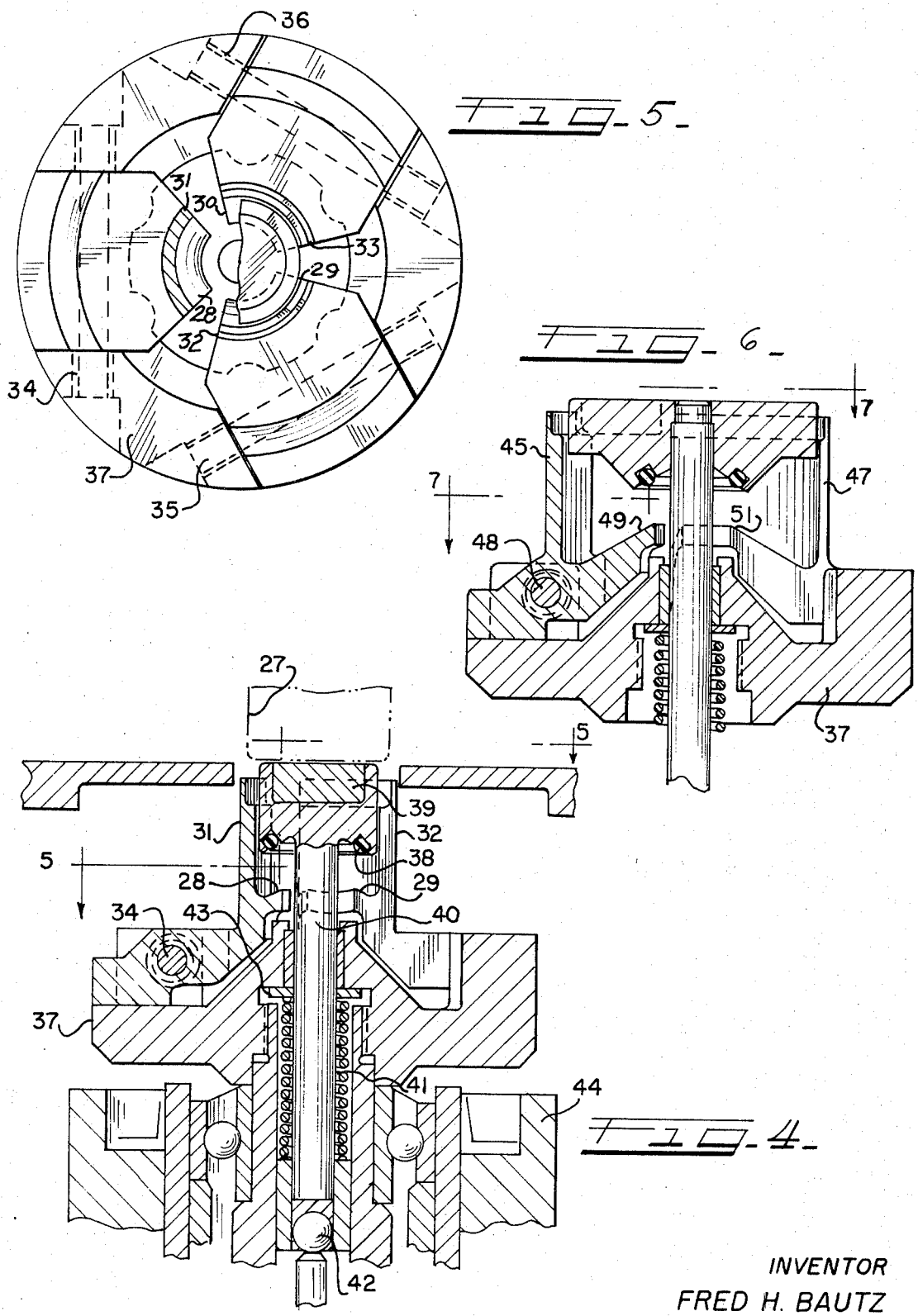

GRIPPING TYPE COMPOUND APPLYING CHUCK ASSEMBLY

My invention relates to a chuck assembly for positively gripping a cap or the like and especially to a chuck assembly which may be used on a compound applying machine to hold the cap in position while compound is being applied.

It is an object of my invention to hold a cap or bottle top in a firm grip while compound is being applied.

It is a further object of my invention to provide a chuck assembly for a cap which is adapted for rapid and reliable operation.

It is a final object of my invention to provide a chuck assembly which is adaptable to a variety of cap or can end sizes.

In brief, my invention is to a chuck assembly which surrounds a cap holder and lifts the cap off of the cap holder to grip the cap firmly between the jaws of the assembly. The gripping means or jaws lift up against the bottom of the holder. Because of the shape of the jaws and the shape of the arm connected to the jaws, the jaws are spring pressed against the cap to hold it firmly while sealing compound is being applied to the interior of the cap.

Although the novel features which are characteristic of this invention are set forth in detail in the claims appended hereto, the nature and scope of the invention may be better understood by referring to the following description, taken in connection with the accompanying drawing forming a part thereof, in which specific embodiments have been set forth for purposes of illustration.

IN THE DRAWING

FIG. 1 shows a sectional view of an embodiment of my chuck assembly.

FIG. 2 shows a sectional view of my chuck assembly when the chuck jaws are upward and ready to grip.

FIG. 3 shows a top view taken on the line 3—3 of FIG. 2.

FIG. 4 shows a modification of my apparatus.

FIG. 5 shows a section view of the apparatus of FIG. 4 taken along the line 5—5.

FIG. 6 shows a further embodiment of my device.

FIG. 7 shows a section view of the apparatus of FIG. 6 taken along the line 6—6.

In present day machines, a cap is placed on a magnet which is located in a pad. The magnet and pad are rotating at approximately 1,800 revolutions per minute. Once the cap is placed on this magnet, it tends to adhere to the magnet and rotates at approximately the same speed as the magnet. The magnet and cap are then moved adjacent the compound applying nozzle and for the space of two revolutions of the cap, the compound applying nozzle squirts compound around the edge of the cap or at any other position where it may be desired. Various difficulties are caused by this mode of operation, because the compound material adheres to the cap top and frequently the cap top slips relative to the pad and its associated magnet. After the compound is extruded into the cap, it is then disengaged from the pad and magnet and conveyed to another station for further processing. Since the transfer, spin and disengagement is done at a fairly high rate of speed involving two to three hundred caps per minute, a supplementary means of holding the cap is needed.

The chuck assembly shown in FIG. 1 is mounted underneath a compound applying machine and the nozzle of the compound applying machine is positioned about one inch above the knockout pad or disc 1. A magnet 2 is located in the pad so that a cap 3 placed on the knockout pad is held to the pad. This magnet is not strong enough to hold the cap at a speed of rotation of possibly 1,800 RPM. The cap, once it is attached to the knockout pad rotates approximately at the speed of rotation of the knockout pad. However, the problem of slippage between the cap and pad is solved by the use of a mechanical chuck assembly 4 which positively grips a cap to hold it during the compound applying operation.

The chuck or gripping assembly 4 of an embodiment of my invention is shown in its lowest position in FIG. 1. When the chuck assembly is in this position, the chuck and rotatable housing 15 is rotating at approximately 1,800 revolutions per minute. The three jaws 5, 6 and 7 (FIG. 3) of the chuck are held open by the centrifugal force generated by the speed of revolution. Cap 3 is shown in phantom outline as deposited on the knockout pad 1. The knockout pad may be a thick disc with rounded sides and having a magnet 2 or magnets on its surface, so that the cap is adherent to the surface and revolves with the surface at approximately the same rate of speed. Now the chuck housing and the three jaws 5, 6, 7 move upward. The three jaws 5, 6, 7 are mounted on the chuck housing. Each jaw and arm 16, 17, 18 together make an integral element mounted about a pivot 11, 12 and 13. The fulcrum point is located in a position so that the rotation of the housing 15 throws each jaw outward until the lower surface 14 of the jaw strikes against the housing in a bottomed-out position as shown in FIG. 1.

After the metallic container cap is placed on the knockout pad, the housing 15 and the jaws are moved upward to the position shown in FIG. 2. At this time, the lever arm 16, 17 and 18 contacts the elastomeric "O" ring 19 in the bottom of the knockout pad. The "O" ring presses against the lever to cause the upper part of the jaws 5, 6, 7 to move inwardly and press against the side of the cap. The pressure of the gripping force spring 20 keeps the upper part of each jaw pressed against the cap 3 with a gripping force sufficient to hold the cap tightly as it turns and the sealing compound is applied to the interior of the cap. The force of the rotatable spring 20 is applied to the arm and transmitted to the jaw to cause the upper jaws to grip tightly against the sides of the cap until the chuck housing 15 is lowered by pivots 21, 22. The pivots and housing is slid on the shaft by an actuating means 52, 53. After the cap has rotated under the compound nozzle for about two turns, the nozzle ceases to extrude sealing compound and the chuck housing and its jaws are withdrawn to the lower positions shown in FIG. 1. At this stage, cap 3 is removed from the knockout pad 1.

The various elements in my device as viewed from above are shown in FIG. 3. The left hand half shows a jaw 5, 6, 7 and arm element 16, 17, 18 exposed. The jaw and arm supporting assembly 23 shows a pair of studs 24, 25 and a pin 26 thrust through the arm 16 and studs 24, 25 to form a pivot 11. The right hand half of FIG. 3 shows the jaw as seen from above. The lever arms 17, 18 of the jaw on the right are shown mainly in phantom outline because they are underneath the knockout pad.

An embodiment of my invention for the clamping of smaller caps is shown in FIG. 4. In this Figure the apparatuses underneath the housing are the actuating means for moving the housing and imparting rotation and a gripping force to the jaws. The elements of which are shown in greater detail than the preceding figures. This device may be used for the clamping of caps 27 whose depth is great in comparison to their width. Obviously the relative dimensions of the arms 28, 29, 30 and jaws 31, 32, 33 may be varied to suit any sort of cap. The principal difference as to this device in comparison with that of FIG. 1, is that the fulcrum 34, 35, 36 is located out at the extreme edge of the chuck housing while the arm and jaw are located relatively close together. Each arm and jaw form a single element out to near the shaft where they branch to form the arms 28,29,30 and jaws 31,32,33 respectively. In this way, the jaw-arm lever ratio is kept so that pressure may be applied to the upper jaw. In each device, as the chuck housing 37 (FIG. 4) or 15 (FIG. 1) moves upward, the lever on each of the jaws strikes the elastomeric "O" ring 38 underneath the knockout pad 39 and acting through the fulcrum forces the jaws to fasten tightly about the cap 27. A cap can be either a shallow cap which falls onto the bearing surfaces at the edge of the jaw or it may be a deeper cap about which the jaw is placed. In any case, as the chuck housing moves upward, the jaw or jaws tighten about the cap.

In the device shown in FIG. 4, the center shaft 40 serves the same essential function as the rotatable center shaft 17 of FIGS. 1, 2 and 3. The clamping force spring 41 operates in the same fashion as spring 20 in FIG. 1. However, the rotary bearing 42 is shown as a ball bearing under center shaft 40 and an oil seal 43 is mounted in the fixed housing 44. The top view of FIG. 5 is taken along the line 5—5 of FIG. 4. This view shows more clearly the location and structural cooperation of the mounting of the jaws 31, 32, 33 in this embodiment.

Another embodiment of my apparatus is shown in FIG. 6. In this embodiment, the jaws 45, 46, 47 are long and are constructed and arranged so that the position of the fulcrum 48, jaws and the lever-arms 49, 50, 51, as shown here, give rise to the advantage of grasping a cap more firmly than in the embodiment shown in FIG. 4. The mechanical advantage of the embodiment of FIG. 6 is greater than that of FIG. 4 because the lever arms of the embodiment of FIG. 6 are longer in relation to the jaws than the corresponding parts in the embodiment of FIG. 4.

The top view of FIG. 7 is taken along the lines 7—7 of FIG. 6. The phantom lines in FIG. 7 show the outline of the pins and studs supporting the jaw and lever arm.

Although a cap is shown in the drawing and discussed in the specification, it is understood that the term is intended to cover caps, bottle tops, can ends or any similarly shaped closures.

The advantages of my apparatus are that it is adapted for rapid and reliable operation, has few moving parts, is adapted to hold a cap or can top firmly but not with crushing force, the various embodiments are adapted to a variety of sizes of caps, tops or can ends.

The foregoing is a description of an illustrative embodiment or embodiments of the invention, and it is applicant's intention in the appended claims to cover all forms which fall in the scope of the invention.

What is claimed is:

1. A chuck assembly for gripping a cap during application of sealing compound comprising:
   a pad having magnetic means for attracting a metallic cap,
   a rotatable shaft fastened to the center of said pad,
   a rotatable housing slidably mounted on said shaft,
   supporting means mounted on said housing on the side of said housing toward said pad,
   spring means for biasing said rotatable housing toward said pad,
   pivot means for moving said rotatable housing toward and away from said pad,
   a plurality of gripping means for gripping a cap between them, each comprising an arm connected to a jaw and a pivot means supporting said arm and jaw and mounted on said supporting means.

2. A chuck assembly for gripping a cap during application of sealing compound as set forth in claim 1 in which said pad comprises:
   a thick disc having a flattish top and rounded sides.

3. A chuck assembly for gripping a cap during application of sealing compound as set forth in claim 1 in which said gripping means comprises:
   a single element extending from said pivot means toward the shaft,
   an arm extending from said single element toward the shaft,
   a jaw extending upward from said single element and adjacent said pad whereby said jaws and said pad form a shaped member for holding a relatively deep container cap.

4. A chuck assembly for gripping a cap during application of sealing compound as set forth in claim 1 further comprising:
   an elastomeric means mounted on said pad between said pad and said rotatable housing whereby when said pad and said housing come close together said elastomeric means presses against said arms and causes said jaws to approach each other.

5. A chuck assembly for gripping a cap during application of sealing compound as set forth in claim 1 in which said supporting means comprises:
   stud means mounted at each side of said gripping means, and being mounted a distance from the shaft greater than the distance between the shaft and the periphery of the pad whereby the length of each arm at least equals the distance from the shaft to the periphery of the pad.

6. A chuck assembly for gripping a cap during application of sealing compound as set forth in claim 5 further comprising:
   an elastomeric means mounted on said pad between said pad and said arm of said gripping means whereby when said housing is moved toward said pad then each said arm impinges on said elastomeric means and each said jaw is urged inward toward said cap.

7. A chuck assembly for holding a cap during application of sealing compound to the interior of the cap comprising:
- a shaft having a first and a second end,
- a pad means for holding a cap and fastened to said first end of said shaft,
- a rotatable housing mounted for rotation about said shaft,
- a supporting means mounted on said rotatable housing,
- pivot means on the side of said housing for moving said rotatable housing toward or away from said pad means,
- a spring for continually urging said rotatable housing in the direction of said pad means,
- a gripping assembly comprising jaw means for gripping said cap,
- arm means integral with said jaw means for moving said jaw means into gripping engagement with said cap and being oriented in a plane extending between said pad and said housing,
- fulcrum means mounted on said supporting means for providing a fulcrum point for said integral jaw and arms, and
- elastomeric means mounted on the bottom of said pad means for pressing against said arm means to cause said jaw means to grip said cap.

8. A chuck assembly for holding a cap during application of sealing compound to the interior of said cap as set forth in claim 7 in which said fulcrum arm and jaw means comprises;
- a plurality of fulcrum bearing means mounted on said supporting means, and
- arm and jaw means mounted at each said fulcrum bearing means whereby when said supporting means is urged upwardly the upper surface of said arm impinges against the lower surface of said pad means and urges said jaw means toward said cap to hold said cap firmly in said jaws.

9. A chuck assembly for holding a cap during application of sealing compound to the interior of said cap as set forth in claim 7 in which said elastomeric means comprises:
- an elastomeric ring mounted on the bottom of said pad whereby when said rotatable housing is urged toward said pad means said arm strikes said pad and said jaw is urged inward toward the center of said pad.

10. A chuck assembly for holding a cap during application of sealing compound to the interior of the cap as set forth in claim 7 in which said pivot means for moving said rotatable housing comprises:
- paired pivot means mounted on opposing sides of said rotatable housing for cooperating with an actuating means to cause said rotatable housing to slide toward and away from said pad.

11. A chuck assembly for holding a cap during application of sealing compound to the interior of the cap as set forth in claim 7 in which said supporting means comprises:
- a plurality of studs each having a fulcrum means for positioning each of said arm means between said housing and said pad and each said jaw means in position to grip said cap when said housing is moved toward said pad.

12. A chuck assembly for holding a cap during application of sealing compound to the interior of the cap as set forth in claim 7 in which said pivot means comprises:
- a pin secured in said supporting means,
- and said arm comprises,
- an elongate member of sufficient mass that when said chuck assembly is rotated the arms tend to move outwardly under the influence of centrifugal force.

* * * * *